United States Patent [19]
Patel et al.

[11] Patent Number: 6,087,421
[45] Date of Patent: Jul. 11, 2000

[54] PENTANONE-BASED CPVC ADHESIVES HAVING REDUCED CONTENT OF HETEROCYCLIC SOLVENTS FOR JOINING CPVC SUBSTRATES

[75] Inventors: Naresh D. Patel, Northridge, Calif.; Edward D. Otremba, Orchard Park, N.Y.; Rashid H. Siddiqi, South Pasadena, Calif.

[73] Assignee: IPS Corporation, Gardena, Calif.

[21] Appl. No.: 09/156,995

[22] Filed: Sep. 18, 1998

[51] Int. Cl.$^7$ ........................................ C08K 5/15
[52] U.S. Cl. .................. 524/113; 524/361; 524/363; 156/333; 523/219
[58] Field of Search .............. 156/333; 524/361, 524/363, 113; 523/219

[56] References Cited

U.S. PATENT DOCUMENTS

| | | | |
|---|---|---|---|
| 3,765,983 | 10/1973 | Putzier | 156/308 |
| 3,811,980 | 5/1974 | Roderhoff | 156/308 |
| 4,672,084 | 6/1987 | Dierdorf et al. | 156/333 |
| 4,675,354 | 6/1987 | Sperling | 156/330.9 |
| 4,910,244 | 3/1990 | Dierdorf et al. | 524/179 |
| 5,252,634 | 10/1993 | Patel et al. | 523/218 |
| 5,384,345 | 1/1995 | Naton | 523/218 |
| 5,470,894 | 11/1995 | Patel et al. | 523/218 |

*Primary Examiner*—Veronica P. Hoke
*Attorney, Agent, or Firm*—Benman & Collins

[57] ABSTRACT

CPVC adhesives for joining CPVC substrates, pipes and articles are provided which comprise (a) about 5 to about 25 wt. % CPVC resin, (b) about 20 to about 90 wt. % of a single pentanone or blends of pentanones, (c) 0 to about 20 wt. % total heterocyclic solvent, and (d) 0 to about 45 wt. % total of non-heterocyclic solvents other than component (b) (such as MEK, acetone, cyclohexanone, and so forth). The CPVC adhesive compositions of this invention permit a reduction in the content of heterocyclic solvents to be achieved while meeting performance standards applicable to CPVC pipe joining, such as hydrostatic burst strength and hydrostatic sustained pressure test.

20 Claims, No Drawings

PENTANONE-BASED CPVC ADHESIVES HAVING REDUCED CONTENT OF HETEROCYCLIC SOLVENTS FOR JOINING CPVC SUBSTRATES

TECHNICAL FIELD

The present invention relates generally to thermoplastic adhesives, and more particularly to adhesives used for joining CPVC (chlorinated polyvinyl chloride) pipe. Specifically, the CPVC adhesives disclosed and claimed herein are solvent-based formulations containing a pentanone or a blend of pentanone isomers in which the formulation is devoid of heterocyclic solvents (e.g., tetrahydrofaran or N-methyl pyrrolidone) or otherwise only contains minimal levels of heterocyclic solvents.

BACKGROUND ART

Solvent-based adhesives have been in use for joining thermoplastic pipe for over 30 years. The development of these adhesives is largely responsible for growth of the thermoplastic pipe industry. Several billion pounds of plastic pipe are produced each year in North America. Rapid-setting, solvent-based adhesives are used to bond the pipes together in a timely manner, as well as to bond thermoplastic pipe fittings (e.g., tees, ells, caps, couplings, and so forth) to such pipe. These rapid-setting, solvent-based adhesives allow for the testing and trouble-shooting of piping systems in a matter of hours while maintaining the long-term durability of pipe itself. These characteristics, rapid-set, ease of use, long-term durability along with low-cost, have made the joining of plastic pipe by solvent-based adhesives a practical and economic system.

The solvent-based adhesives generally are formulated by dissolution of a relatively small amount of resin solids in a volatizable solvent carrier. The solvent-based adhesives work primarily by two means of action. First, upon surface application to a thermoplastic pipe surface, the solvent portion of the solvent-based adhesive formulation softens (i.e., partially dissolves) the outer surfaces of the pipe through solvation of the plastic such that the plastic surface becomes tackified. Subsequently, the adhesive "cures", i.e., hardens, by evaporation of the solvent fraction into the surrounding atmosphere from the pipe. Before the adhesive cures completely, the adhesive-treated plastic surface is brought into contact with the surface of another plastic piece to which it will be surface-attached, often under pressure. Secondly, the resin dissolved in the adhesive formulation remains at the plastic joint location and dries through the solvent evaporation and diffusion to ultimately provide a continuous joint between the bonded pipe surfaces, which aids in preserving the integrity of the entire pipe system. The term "adhesive", as as used in this specification and in the claims herein, whether in its singular or plural forms, includes cements, glues and pastes.

These solvent-based adhesives cure rapidly (viz., within a matter of hours), often permitting piping systems to be tested the same day as constructed. However, perhaps the most important benefit of these solvent-based adhesives is the maintenance of the integrity of the pipe itself. The resin solids component of the solvent-based adhesive can be selected so as to match the plastic pipe material and or plastic fitting material. This provides for a high degree of long-term durability for the piping system, often up to 30 to 40 years of useful life. This long service-life is essential for piping systems which are built into long-term structures such as homes and buildings, or where buried underground.

Thousands of miles of thermoplastic piping systems are constructed each day throughout the world, primarily by the means previously described. These systems are used in the transfer of potable water for drinking; residential hot and cold water systems; drain, waste, and vent (DWV) applications in home and industry; turf and agricultural sprinkler systems; Jacuzzi, spa and tub connections, residential and commercial fire sprinkler systems; and so forth. These systems are crucial to the maintenance of safe and healthy means of transport of water and other chemicals throughout the world.

Evaporation of organic solvents from adhesives, as well as paints, coatings and the like, has created concerns from an environmental perspective, as it represents a source of air pollution. Typical solids (non-volatile) contents of thermoplastic solvent-based pipe adhesives are 10 to 20% for CPVC, with the balance of the formulation constituted primarily by solvent. Thus, current adhesives and primers incorporate the use of highly volatile solvents as major portions of the formulations. Among these, tetrahydrofuran (THF) is highly volatile at 20° C. with a vapor pressure of 143 mm Hg. Co-solvents currently used are acetone (vapor pressure of 185 mm Hg), and methyl ethyl ketone (vapor pressure of 70 mm Hg). While other solvents, such as cyclohexanone (vapor pressure of 2 mm Hg at 20° C.), may also be used in such solvent-based plastic pipe adhesives, the amounts of such solvents are comparatively minor, namely, considerably less than 10 wt. %, of the total adhesive formulation.

Many of these solvents typically used in thermoplastic solvent-based pipe adhesives, e.g., tetrahydrofuran (THF), methyl ethyl ketone (MEK), and acetone, are considered to be volatile organic compounds ("VOC", calculated in accordance with ASTM D-2369). That is, VOCs are defined as volatile compounds which contain the element carbon, excluding compounds such as methane, carbon monoxide, carbon dioxide, carbonic acid, metallic carbides and carbonates, ammonium carbonates, as well as certain exempted solvents such as methylene chloride and 1,1,1-trichloroethane. Typical VOC values of present commercial CPVC solvent-based adhesives range from 775 to 850 grams/liter (g/L), and the VOC composite partial pressures are between 120 and 160 mm Hg at 20° C.

THF is a heterocyclic compound that is readily commercially available. THF is a very efficient solvent in CPVC and PVC adhesives because of its effective dissolution of CPVC and PVC resins and its relatively high vapor pressure that allows fast bond formation. As a consequence, adhesive formulations employing THF as a solvent yield pipe joints that are very strong even under hydrostatic pressure. Another heterocyclic compound, N-methyl pyrolidine (NMP), also has been used in conventional PVC adhesives as it effectively dissolves PVC and CPVC resins. However, NMP has a relatively low vapor pressure and, consequently, it normally must used in combination with a higher vapor pressure solvent or solvents, such as THF, in order to develop effective bond strength in a reasonable period of time. However, specific environmental concerns recently have been raised regarding the high content levels of THF present in many current solvent-based adhesive formulations, such as plastic pipe formulations.

For these reasons, it would be highly desirable to develop CPVC adhesive formulations that completely omit heterocyclic solvents, or at least significantly limit the content of heterocyclic solvents, such as THF, while still meeting performance standards applicable to thermoplastic pipe. Namely, such adhesives must meet the required hydrostatic burst strength and other performance standards applicable to CPVC pipe adhesives, such as set forth in ASTM F-493 and D-2846.

DISCLOSURE OF INVENTION

In accordance with the invention, CPVC adhesive formulations for joining CPVC pipes are provided. The CPVC adhesive comprises:

(a) about 5 to about 25 wt. % CPVC resin;

(b) about 20 to about 90 wt. % total pentanone;

(c) 0 to about 20 wt. % total heterocyclic solvent; and (d) 0 to about 45 wt. % total non-heterocyclic solvent other than component (b).

In a more specific embodiment, component (d) of the above formulation relates to non-heterocyclic ketones, such as acetone, methyl ethyl ketone and/or cyclohexanone and so forth, other than pentanones (i.e., excluding component (b) of the formulation). In another more specific embodiment, the CPVC adhesive formulation of the invention comprises about 5 to about 15 wt. % CPVC resin; about 25 to about 90 wt. % total pentanone; 0 to about 20 wt. % total heterocyclic solvent; and 0 to about 40 wt. % total non-heterocyclic solvent other than component (b).

In another embodiment, the CPVC adhesive formulation comprises:

(a) about 5 to about 25 wt. % CPVC resin;

(b) a solvent system selected from the group consisting of (i) about 20 to about 90 wt. % of a single type of pentanone isomer, such as diethyl ketone (DEK), methyl n-propyl ketone (MPK) or methyl isopropyl ketone (MIPK), as the sole solvent in the formulation, (ii) about 20 to about 90 wt. % total of a blend of different pentanone isomers as the only solvents in the formulation, with the pentanone blend comprising at least two pentanone isomers selected from among diethyl ketone (DEK) (IUPAC name: 3-pentanone), methyl n-propyl ketone (MPK) (IUPAC name: 2-pentanone) and methyl isopropyl ketone (MIPK) (IUPAC name: 3-methyl-2-butanone), where DEK, MPK, and MIPK each independently constitute from about 1 to about 99 wt. %, where present, of the pentanone blend, (iii) about 20 to about 90 wt. % of a single type of pentanone isomer, such as diethyl ketone (DEK), methyl n-propyl ketone (MPK), or methyl isopropyl ketone (MIPK), used in combination with at least one additional solvent selected from the group consisting of about 1 to about 20 wt. % tetrahydrofuran (THF), about 1 to about 20 wt. % methyl ethyl ketone (MEK), about 1 to about 20 wt. % cyclohexanone, and about 1 to about 20 wt. % acetone, and (iv) about 20 to about 90 wt. % total of a blend of different pentanone isomers, with the pentanone blend comprising at least two of diethyl ketone (DEK), methyl n-propyl ketone (MPK) and methyl isopropyl ketone (MIPK), where DEK, MPK, and MIPK each independently constitute from about 1 to about 99 wt. %, where present, of the pentanone blend, and wherein the pentanone mixture is used in combination with at least one additional solvent selected from the group consisting of about 1 to about 20 wt. % tetrahydrofuran (THF), about 1 to about 20 wt. % methyl ethyl ketone (MEK), about 1 to about 20 wt. % cyclohexanone, and about 1 to about 20 wt. % acetone; and (c) up to about 8 wt. % total of at least one additive selected from the group consisting of colorants, fillers, stabilizers, thixotropic agents, wetting agents, polymeric rheology aids and adhesion promoters.

The solvent-based adhesives of this invention eliminate or drastically reduce the reliance upon heterocyclic solvents, while meeting or exceeding the hydrostatic burst performance values prescribed in ASTM Method F-493 and D-2846. Moreover, the cure time, bond strength and hydrostatic durability of these inventive adhesives are competitive with current commercial CPVC adhesives.

For purposes of the specification and claims herein, the terminology "heterocyclic solvent" means a compound or combination of compounds each having a ring structure made up of more than one kind of atom in which the ring structure includes carbon atoms and at least one heteroatom (e.g., O, N, S), and which softens CPVC pipe surfaces upon contact therewith.

THF is an example of such a heterocyclic solvent as defined. Where abbreviations are used in the specification and/or claims herein for chemical names, they have the same meaning throughout as defined herein.

BEST MODES FOR CARRYING OUT THE INVENTION

The major portion of solvent emission from solvent-based thermoplastic pipe adhesives occurs during application of the adhesive to the pipe. The sources of these emissions are the primer used to prepare the pipe surface, open containers filled with adhesive, as well as the bead applied to the pipe and fittings themselves, including spillage of adhesive onto the ground during application. Once the pipe and fittings are welded together, the contribution from the adhesive in the joint is minimal. The majority of the solvent remaining in the adhesive bead is absorbed into the substrates.

In the present invention, a solvent-based adhesive formulation is introduced that eliminates or at least significantly reduces the levels of heterocyclic solvents therein, especially tetrahydrofuran (THF), which previously has been relied upon as a primary component of typical CPVC pipe adhesives.

In accordance with the invention, adhesives for bonding CPVC pipes and articles are formulated by incorporating CPVC resin in amounts ranging from about 5 to 25 wt. % total, into a primary solvent system being comprised of one or a blend of a pentanone isomers selected from among (1) diethyl ketone (IUPAC name: 3-pentanone), having a boiling point (B.P.) of 102° C., or (2) methyl n-propyl ketone (IUPAC name: 2-pentanone), having a B.P. of 100° C., and (3) methyl isopropyl ketone (IUPAC name: 3-methyl-2-butanone), having a B.P. of 95° C. Since the three aforesaid pentanones have similar vapor pressures, the evaporation rates of any of the blends are very similar and compatible. The solvent-based adhesives formulated with them form acceptable "green" strength to allow pressure testing within 15 minutes. These pentanones can be further blended, individually or as mixed pentanones, together with secondary solvents, such as tetrahydrofuran (TBF), methyl ethyl ketone (MEK), cyclohexanone and acetone to adjust the vapor pressure of the final blend thus controlling drying time, or to adjust solution viscosity, resin contents and cost of the final adhesive formula, with the proviso that the total or combined amount of any heterocyclic solvent(s) present can be limited to no more than 20 wt. % of the overall adhesive formulation without sacrificing pipe adhesive performance. In the present application, the terminology "methyl propyl ketone", where used, will be understood to encompass either or both the methyl n-propyl ketone isomer or the methyl isopropyl ketone isomer thereof.

Any of the CPVC resins commonly employed in CPVC adhesives may be used in the practice of the invention. The CPVCs useful in the compositions of this invention include chlorinated polyvinyl chloride homopolymers and copolymers. A useful commercial brand of CPVC resin is B. F. Goodrich Temprite 677X670 CPVC resin. Tables I and II set forth below summarize several properties observed by the present inventors for pentanone isomers, as well as several commonly used solvents in CPVC adhesives, relative to B. F. Goodrich Temprite 677X670 CPVC resin.

TABLE I

| Solvent | % CPVC Resin solubility | viscosity (cps) @ 12 wt. % CPVC resin | Boiling pt. (° C.) |
|---|---|---|---|
| acetone | none | — | 56 |
| methyl ethyl ketone (MEK) | none | — | 80 |
| methyl n-propyl ketone (MPK) | 16 | 60 | 100 |
| methyl isopropyl ketone (MIPK) | 12 | 100 | 95 |
| diethyl ketone (DEK) | 18 | 40 | 102 |
| ethyl propyl ketone (EPK) | 12 | 75 | 123 |
| methyl isobutyl ketone (MIBK) | 6 | — | 115 |
| cyclohexanone | >18 | 135 | 155 |
| methyl amyl ketone (MAK) | 10 | gelled | 150 |
| methyl isoamyl ketone (MIAK) | 12 | 140 | 145 |
| tetrahydrofuran (THF) | >18 | 35 | 66 |

TABLE II

| solvent | Hansen Solubility Parameters | | | | surface tension (dynes/cm) | % solubility @ R.T. |
|---|---|---|---|---|---|---|
| | SPo total | SPd | SPp | SPh | | |
| acetone | 9.8 | 7.6 | 5.1 | 3.4 | 22.86 | none |
| MEK | 9.3 | 7.8 | 4.4 | 2.5 | 24.18 | none |
| MPK | 9.6 | 7.7 | 4.4 | 3.7 | 24.9 | 16 |
| MIPK | 8.8 | 7.2 | 3.0 | 4.0 | 24.61 | 12 |
| DEK | 8.8 | 7.7 | 3.7 | 2.3 | 25.09 | 18 |
| EPK | — | — | — | — | 123 | — |
| MIBK | 8.3 | 7.5 | 3.0 | 2.0 | 23.36 | 5–6 |
| cyclohexanone | 9.6 | 8.7 | 3.1 | 2.5 | 34.05 | >18 |
| MAK | 9.7 | 7.9 | 2.7 | 4.9 | 26.12 | 12 |
| MIAK | 8.5 | 7.8 | 2.8 | 2.0 | 25.33 | 10 |
| THF | 9.5 | 8.2 | 2.8 | 3.9 | 26.5 | >18 |

As indicated above, the CPVC resin is contained in the adhesive formulation in an amount ranging from about 5 to about 25 wt. %, preferably from about 5 to about 15 wt. % of the total adhesive. If too small an amount of CPVC resin is used, it may not be possible to form an effective and durable pipe joint and VOC levels will tend to increase, while, if the amount of CPVC resin too great, it may not all solubilize in the solvent(s) and thus tends to form an undesirable 'gel' therewith.

CPVC resins useful in this invention may be prepared by chlorination of polyvinyl chloride homopolymers and copolymers starting materials by procedures known to those skilled in the art. Examples of useful polyvinyl chloride homopolymers and copolymers starting materials in this regard include those described in U.S. Pat. No. 5,384,345, which teachings are incorporated herein by reference. CPVC resins are typically supplied in powder form when obtained from commercial sources. The CPVC resins used in this invention may contain chlorine in any amount effective to impart adequate heat deflection resistance property to the adhesive composition for the intended use(s). The chlorine content of the CPVC resins used in the compositions of this invention will range from about 50 to about 80% by weight, and more specifically about 57 to about 70% by weight.

Particularly preferred are those CPVC resins characterized by an inherent viscosity (I.V.) ranging from about 0.60 to 0.95, and more preferably about 0.68 to about 0.92. Inherent viscosity (I.V.) is a qualitative measure of molecular weight; that is, the higher the I.V., the higher the molecular weight.

The solvent system employed in the CPVC adhesive of the invention can include at least one secondary solvent that is a high vapor pressure solvent comprising THF in an amount up to about 20 wt. % of the adhesive formulation, and/or methyl ethyl ketone (MEK) in an amount of 1 to about 20 wt. % of the adhesive formulation, with the additional proviso that total high vapor pressure solvent concentration does not exceed a maximum concentration of about 55 wt. % of the total adhesive composition. Although MEK is not a true solvent for the CPVC resin system, i.e., it does not readily dissolve CPVC resins, it nonetheless is added to improve brushability of the adhesive onto the CPVC pipe.

As to other mentioned secondary solvents, cyclohexanone, like THF, is a true solvent for PVC resins. However, due to the low vapor pressure of cyclohexanone and its inability at high levels to etch or soften CPVC pipe at freezing or subfreezing temperatures, it is generally limited in amount in standard CPVC adhesives to less than 45 wt. %. Acetone, like MEK, is not a true solvent for CPVC resin but is added to increase the adhesive drying time and also because it is exempt from VOC regulations plus it is cost effective.

The pentanones, DEK, MPK, and MIPK are also true solvents for CPVC, and their moderate vapor pressures allows formulation with them as sole solvents or in blends together and also in blends with the other typical CPVC solvents like THF, MEK cyclohexanone and acetone. Acyclic hexanones and heptanones also exhibit moderate solvency for CPVC resins, as shown in Table I above; however, the heptanones have vapor pressures similar to cyclohexanone and their higher costs affords no advantage to use over cyclohexanone. As to acyclic hexanones, methyl isobutyl ketone (MIBK) has limited solubility for CPVC and ethyl propyl ketone (EPK) is limited for commercial use in adhesives because of cost and poorer solvency and lower vapor pressure.

The CPVC adhesives of this invention may include fillers, thixotropic agents, colorants (e.g., pigments, dyes), stabilizers, oligomeric and polymeric rheology additives, wetting agents, and adhesion promoters. Up to about 8 wt. % of the adhesive may contain such additional additives and adjuvants. Any fillers, thixotropic agents, pigments, dyes, stabilizers oligomeric and polymeric rheology additives, wetting agents, and adhesion promoters that are commonly used in CPVC adhesives my be employed in the practice of the present invention.

Preferred fillers low specific gravity hollow spheres (glass or ceramic), and include solid particulate inorganic fillers such as calcium carbonate, aluminum trihydrate and calcium sulphate.

Preferred colorants include dyes and pigments, such as titanium dioxide, carbon black, aluminum Lake based-orange, and conventional red or yellow colorants. Preferred thixotropic agents include fumed silica and precipitated silica (e.g. AERO-SIL-200 available from Degussa Corporation, Cab-O-Sil MS available from Cabot Corporation, and HISIL T600) and treated bentonite clay (e.g., Bentone 27), and these may be used at low levels to obtain optimum flow properties, especially with regard to controlling spillage from the pipe upon application. Stabilizers will include such additives as acid scavengers, antioxidants (e.g., hindered phenols) and tin stabilizers. Rheology additives would include non-CPVC thermoplastic resins, such as one or more of thermoplastic PVC polymers, acrylic polymers, MBS polymers, ABS polymers, linear and core/shell polymers, and random and block polymers including elastomeric and rubber resins.

A preferred composition of the invention is given by the following formulation: (a) about 5 to about 15 wt. % CPVC resin; (b) about 25 to about 90 wt. % total pentanone; (c) 0 to about 20 wt. % total heterocyclic solvent; and (d) 0 to about 40 wt. % total non-heterocyclic solvent other than component (b). Another preferred composition of this invention is given by the following formulation: (a) 5 to 25 wt. % CPVC resin (%Cl=60 to 70; I.V. 0.60–0.92); (b) 1 to 90 wt. % diethyl ketone; (c) 1 to 90 wt. % methyl propyl ketone, with the proviso that the total amount of components (b) and (c) does not go below 20 wt. % and does not exceed 90 wt. % of the overall composition; (d) 1 to 20 wt. % tetrahydrofuran; (e) 1 to 20 wt. % methyl ethyl ketone; (f) 1 to 20 wt. % cyclohexanone; (g) 1 to 20 wt. % acetone, with the proviso that the total combined amount of components (e), (f) and (g) does not exceed 45 wt. % of the overall composition; and (h) 1 to 8 wt. % additives (e.g., pigments, dyes, fillers, thixotropic agents, polymeric rheology aids, stabilizers, wetting agents, and adhesion promoters and so forth).

The adhesives of the invention are advantageously made in a batch process. The solvents are charged one at a time to the mixing tank and blended for a short period of time to achieve a state of equilibrium. The resin is then charged to the mixer and mixed with high shear dispensers to achieve complete dissolution in the system. At this point, the pigments and fillers (if needed) are added and dispersed to ensure substantially uniform dispersion. The thixotropic agent (if needed) is added last and dispersed to achieve the desired flow characteristics.

The adhesives of the invention are useful in joining CPVC pipe in all CPVC applications, including, but not limited to, hot and cold water plumbing systems (residential) raging from ¼ inch to 2 inch pipe and CPVC fire sprinkler systems ranging from ¾ inch to 4 inch pipe (residential and commercial). The joint is readily made and quickly placed into service. The adhesives of the invention are applied to the CPVC joints in the same way as other commercial CPVC adhesives.

Within about 15 minutes of applying the adhesive of the invention, it is possible to carry out pressure tests. Further, no primer is needed. Consequently, the adhesive of the invention may be considered to be a one-step cement, in contrast to prior art formulations, which require a primer and hence are two-step cements. Without subscribing to any particular theory, it appears that the higher level of low vapor pressure solvent etches the pipe and/or fitting in the same manner that the primer does.

The adhesives of the invention maintain the shelf stability associated with presently used CPVC adhesives and meets or exceeds performance requirements. Specifically, the adhesives meet ASTM F-493 and D-2846 performance standards.

The inventive adhesives are considered to be fast curing; for example, in hot and cold water residential plumbing systems, curing takes about 15 to 30 minutes, which allows for pressure testing in a short period of time, compared to presently available CPVC adhesives.

EXAMPLES

Examples 1–8

The following compositions listed in Table III below exemplify adhesive compositions of the present invention. The additional ("add'l") solids include the total of pigments, fillers, thixotropic agents, and stabilizers. The numerical amounts listed in Table III for the various ingredients of the adhesive formualtion are set forth as respective weight percentages of the total adhesive formulation. Table III also includes the viscosity of the adhesive (as measured by a Brookfield viscometer). The CPVC resin used was B. F. Goodrich Temprite 677X670 CPVC resin having an intrinsic viscosity (I.V.) of 0.65.

The hydrostatic burst strength (in psi) was measured at two temperatures: viz., room temperatures (73° F., or 22.8° C.) and 180° F. (82.2° C.), on joining 2 inch CPVC Schedule 80 pipe after 2 hours of drying at the indicated temperature. For comparison, the minimum ASTM required value per ASTM F-493 is 400 psi (@73° F.) and 200 psi (@180° F.).

The hydrostatic sustained pressure was conducted at 180° F. (82.2° C.) on joining 0.5 inch (1.27 cm) CPVC pipe per ASTM D-2846. For meeting the requirement per ASTM F-493 and D-2846, the assembly was maintained in water at 180° F. (82.2° C.). For 4 hours at 364 psi. A pass/fail indication sufficed to indicate whether the test is met.

The VOC level (g/L) was measured, using Method 316A, as provided in Rule 1168 of SCAQMD (Southern California Air Quality Management District). For comparison, the maximum VOC level permitted is 450 g/L.

The results of the hydrostatic and VOC measurements are shown in Table III.

TABLE III

| Component | Examples | | | | | | | |
| --- | --- | --- | --- | --- | --- | --- | --- | --- |
| | 1 | 2 | 3 | 4 | 5 | 6 | 7 | 8 |
| CPVC resin | 11.0 | 10.0 | 10.0 | 12.0 | 12.0 | 12.0 | 12.0 | 12.0 |
| DEK | 83.6 | 0.0 | 42.3 | 60.0 | 0.0 | 30.0 | 19.0 | 16.0 |
| MPK | 0.0 | 84.6 | 42.3 | 0.0 | 60.0 | 30.0 | 19.0 | 16.0 |
| THF | 0.0 | 0.0 | 0.0 | 5.0 | 5.0 | 5.0 | 11.0 | 12.0 |
| MEK | 0.0 | 0.0 | 0.0 | 5.0 | 5.0 | 5.0 | 11.0 | 12.0 |
| cyco-hexanone | 0.0 | 0.0 | 0.0 | 5.0 | 5.0 | 5.0 | 11.0 | 12.0 |
| acetone | 0.0 | 0.0 | 0.0 | 5.0 | 5.0 | 5.0 | 11.0 | 12.0 |
| Add'l solids | 5.4 | 5 | 4 | 5.4 | 8.0 | 8.0 | 8.0 | 6.0 | 8.0 |
| Total | 100.0 | 100.0 | 100.0 | 100.0 | 100.0 | 100.0 | 100.0 | 100.0 |
| viscosity (cps) | 225 | 335 | 670 | 2200 | 1680 | 1920 | 560 | 940 |
| VOC level (g/L) | 349 | 324 | — | 443 | 438 | 422 | 415 | — |
| Hydrostatic Burst Strength (psi) @ 73° C. | 525 | 450 | 550 | 485 | 490 | 525 | 550 | 550 |
| Hydrostatic Burst Strength (psi) @ 180° F. | 390 | 375 | 425 | 400 | 450 | 450 | 400 | 350 |

TABLE III-continued

| | Examples | | | | | | | |
|---|---|---|---|---|---|---|---|---|
| Component | 1 | 2 | 3 | 4 | 5 | 6 | 7 | 8 |
| Hydrostatic Sustained Pressure | Pass | Pass | Pass | Pass | Pass | Pass | Pass | Pass |

As seen from the results in Table III, the adhesive compositions of the invention are seen to maintain and in many cases exceed ASTM F-493 and ASTM D-2846 performance requirements while using no or only limited amounts of heterocyclic solvents (viz. THF).

Comparative Examples 9–10

A comparative evaluation using a "typical" level of heterocyclic (THF) solvent in two solvent-based CPVC adhesive formulations which were tested for viscosity, hydrostatic burst strengths and hydrostatic sustained pressure in the manners prescribed in Examples 1–8. The CPVC resin used again was B. F. Goodrich Temprite 677X670 CPVC resin having an intrinsic viscosity (I.V.) of 0.65. The numerical amounts listed in Table III for the various ingredients of the adhesive formualtion are set forth as respective weight percentages of the total adhesive formulation. The results are summarized in Table IV, which also summarizes the test adhesive formulation employed.

TABLE IV

| Component | Comp. Example 9 | Comp. Example 10 |
|---|---|---|
| CPVC resin | 20.0 | 13.0 |
| THF | 35.0 | 48.0 |
| MEK | 25.0 | 28.0 |
| cyclohexanone | 15.0 | 9.0 |
| Add'l solids | 5.0 | 2.0 |
| total solids | 100.0 | 100.0 |
| viscosity (cps) | 1,400 | 160 |
| Hydrostatic burst strength (psi) @ 73° F. | 510 | 550 |
| Hydrostatic burst strength (psi) @ 180° F. | 400 | 365 |
| Hydrostatic Sustained Pressure | Pass | Pass |

By comparison of the results of Comparative Examples 9 and 10, as reported in Table IV, with those reported for Examples 1–8 in Table III, the effectiveness of the inventive adhesives is clearly demonstrated, i.e., the CPVC adhesives of the present invention are capable of efficiently bonding CPVC pipe while being free of or containing only minimal (viz., less than 20%) of heterocyclic solvents, such as THF.

The results achieved for the inventive adhesive formulations would not have been suggested or predicted from the data reported above in Tables I and II, indicating Hansen Solubility Parameters, surface tension, chemical structure, evaporation rate, and so forth, which show no correlations between these solvents properties and CPVC resin solubility and resulting adhesive efficiency. Indeed, the fact that MEK exhibits no solvency for a typical CPVC resin (e.g., B. F. Goodrich Temprite 677X670 with 67% chlorination), while the dissolution of up to 18% of that same CPVC resin is observed in DEK, which merely has one additional methylene group in its structure, would not be predicted. The higher homologs (e.g., acyclic hexanones and heptanones) all show less solubility in the same CPVC resin, and their increasing boiling points (or decreasing vapor pressures) makes them as less efficient solvent candidates for CPVC adhesives for use in CPVC pipe bonding.

Moreover, analysis of the Hansen Solubility Parameters (Table II) total parameters Spo or their individual components SPd (non-polar), SPp (polar) SPh (Hydrogen bonding) shows no correlation between their values and CPVC dissolution. For example, THF, the strongest solvent for CPVC, has Hansen Parameters close to MPK but very different than its isomer DEK, yet DEK is an excellent solvent for CPVC (~18% solids solution).

INDUSTRIAL APPLICABILITY

The CPVC adhesive formulations disclosed and claimed herein are expected to find use in joining CPVC pipes and other articles together.

Thus, a new class of CPVC adhesive formulations have been disclosed herein for bonding CPVC articles to CPVC articles. It will be readily apparent to those skilled in the art that various changes and modifications of an obvious nature may be made, and all such changes and modifications are considered to fall within the scope of the invention as defined by the appended claims.

What is claimed is:

1. A chlorinated polyvinyl chloride (CPVC) adhesive for joining CPVC substrates comprises:
    (a) about 5 to about 25 wt. % CPVC resin;
    (b) about 20 to about 90 wt. % total pentanone;
    (c) 0 to about 20 wt. % total heterocyclic solvent; and
    (d) 0 to about 45 wt. % total non-heterocyclic solvent other than component (b).

2. The CPVC adhesive of claim 1, wherein said pentanone is diethyl ketone.

3. The CPVC adhesive of claim 1, wherein said pentanone is methyl n-propyl ketone.

4. The CPVC adhesive of claim 1, wherein said pentanone is methyl isopropyl ketone.

5. The CPVC adhesive of claim 1, wherein said pentanone is a blend of at least two different pentanone isomers.

6. The CPVC adhesive of claim 1, wherein the pentanone is a a blend of at least two different pentanone isomers selected from the group consisting of diethyl ketone, n-propyl ketone, and methyl isopropyl ketone, wherein each pentanone isomer present in said pentanone blend is contained in an amount of 1 to 99 wt. % of said pentanone blend.

7. The CPVC adhesive of claim 1, firther comprising up to about 8 wt. % total of at least one additive selected from the group consisting of colorants, fillers, stabilizers, thixotropic agents, wetting agents, polymeric rheology aids and adhesion promoters.

8. The CPVC adhesive of claim 7, wherein said thixotropic agent is present and said thixotropic agent is selected from the group consisting of fumed silica, precipitated silica, and treated bentonite clay.

9. The CPVC adhesive of claim 7, wherein said filler is present and said filler is selected from the group consisting of low specific gravity hollow glass spheres, low specific gravity hollow ceramic spheres, calcium carbonate, alumina trhydrate and calcium sulfate.

10. The CPVC adhesive of claim 1, wherein said polymeric rheology additive is selected from the group consisting of thermoplastic PVC polymers, acrylic polymers, MBS polymers, ABS polymers, linear polymers, core/shell polymers, random polymers, block polymers, elastomeric resins, and rubbers.

11. The CPVC adhesive of claim 1, wherein said CPVC resin has a molecular weight value ranging from about 0.60 to 0.95 as measured by inherent viscosity.

12. The CPVC adhesive of claim 1, wherein said CPVC resin has a chlorination level ranging from about 57 to about 70 wt. %.

13. A CPVC adhesive formulation for joining CPVC substrates comprising:
   (a) about 5 to about 25 wt. % of CPVC resin;
   (b) a solvent system selected from the group consisting of
      (i) about 20 to about 90 wt. % of a single type of pentanone,
      (ii) about 20 to about 90 wt. % total of a blend of different pentanone isomers,
      (iii) about 20 to about 90 wt. % of a single type of pentanone used in combination with at least one additional solvent selected from the group consisting of about 1 to about 20 wt. % tetrahydrofuran, about 1 to about 20 wt. % methyl ethyl ketone, about 1 to about 20 wt. % cyclohexanone, and about 1 to about 20 wt. % acetone, and
      (iv) about 20 to about 90 wt. % total of a blend of different pentanone isomers used in combination with at least one additional solvent selected from the group consisting of about 1 to about 20 wt. % tetrahydrofluan, about 1 to about 20 wt. % methyl ethyl ketone, about 1 to about 20 wt. % cyclohexanone, and about 1 to about 20 wt. % acetone; and
   (c) up to about 8 wt. % total of at least one additive selected from the group consisting of pigments, fillers, stabilizers, thixotropic agents, wetting agents, rheology aids and adhesion promoters.

14. A CPVC adhesive for joining CPVC pipes consisting essentially of:
   (a) about 5 to about 25 wt. % CPVC resin;
   (b) about 20 to about 90 wt. % total pentanone;
   (c) about 1 to about 20 wt. % tetrahydrofuran;
   (d) about 1 to about 20 wt. % methyl ethyl ketone;
   (e) about 1 to about 20 wt. % cyclohexanone;
   (f) about 1 to about 20 wt. % acetone, with the proviso that the total amount of components (d), (e) and (f) does not exceed 45 wt. %; and
   (g) up to 8 wt. % of at least one additive selected from the group consisting of pigments, fillers, stabilizers, thixotropic agents, wetting agents, rheology aids and adhesion promoters.

15. The CPVC adhesive of claim 14, wherein said pentanone is selected from the group consisting of diethyl ketone, methyl n-propyl ketone, and methyl isopropyl ketone, and mixtures thereof.

16. A method for reducing heterocyclic solvent content in a CPVC adhesive used for joining CPVC substrates, wherein said adhesive is formulated by combining:
   (a) a resin component consisting essentially of about 5 to about 25 wt. % CPVC resin;
   (b) about 20 to about 90 wt. % total pentanone;
   (c) 0 to about 20 wt. % total heterocyclic solvent; and
   (d) 0 to about 45 wt. % total non-heterocyclic solvent other than component (b).

17. The method of claim 16, wherein said pentanone is selected from the group consisting of diethyl ketone, methyl n-propyl ketone, and methyl isopropyl ketone.

18. The method of claim 16, wherein said pentanone is selected to be a blend of at least two different pentanone isomers.

19. The method of claim 16, wherein said heterocyclic solvent includes tetrahydrofuran.

20. The method of claim 16, further comprising combining up to 8 wt. % of at least one additive selected from the group consisting of colorants, fillers, stabilizers, thixotropic agents, wetting agents, polymeric rheology aids and adhesion promoters.

* * * * *